United States Patent
Danilak

(10) Patent No.: US 7,623,134 B1
(45) Date of Patent: Nov. 24, 2009

(54) SYSTEM AND METHOD FOR HARDWARE-BASED GPU PAGING TO SYSTEM MEMORY

(75) Inventor: Radoslav Danilak, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 537 days.

(21) Appl. No.: 11/455,075

(22) Filed: Jun. 15, 2006

(51) Int. Cl.
  *G06F 13/00* (2006.01)
  *G06F 12/10* (2006.01)
  *G06F 9/34* (2006.01)

(52) U.S. Cl. ................. 345/568; 345/537; 345/538; 711/206; 711/207

(58) Field of Classification Search ........... 345/537, 345/538, 568; 714/2, 5; 710/22, 308; 711/203, 711/206–209
See application file for complete search history.

(56) References Cited

U.S. PATENT DOCUMENTS

| 5,301,287 A | * | 4/1994 | Herrell et al. | 711/202 |
| 5,555,395 A | * | 9/1996 | Parks | 711/145 |
| 5,592,670 A | * | 1/1997 | Pletcher | 718/100 |

* cited by examiner

*Primary Examiner*—Hau H Nguyen
(74) *Attorney, Agent, or Firm*—Patterson & Sheridan, LLP

(57) ABSTRACT

One embodiment of the present invention sets forth a technique for processing address page requests in a GPU system that is implementing a virtual memory model. A hardware-based page fault manager included in the GPU system intercepts page faults otherwise processed by a software-based page fault manager executing on a host CPU. The hardware-based page fault manager in the GPU includes a DMA engine capable of reading and writing pages between system memory and frame buffer memory without involving the CPU or operating system. A net improvement in system performance is achieved by processing a significant portion of page faults within the GPU, reducing the overall load on the host CPU.

20 Claims, 2 Drawing Sheets

SYSTEM AND METHOD FOR HARDWARE-BASED GPU PAGING TO SYSTEM MEMORY

BACKGROUND OF THE INVENTION

1. Field of the Invention

Embodiments of the present invention relate generally to graphics processor unit memory systems and more specifically to a system and method for hardware-based GPU paging to system memory.

2. Description of the Related Art

Certain graphics processing systems utilize a virtual memory model to enable greater flexibility in the use of available memory resources. For example, a computing device with 2 gigabytes of system memory may include a graphics processing unit (GPU) with a locally attached 256 megabytes of frame buffer memory. In addition to storing frames of display information, the frame buffer memory may also store textures, application data structures, and subroutines for rendering, shading and related processing. Without a virtual memory model, a graphics application requiring more than 256 megabytes of frame buffer memory would not be able to run on a GPU with only 256 megabytes of frame buffer memory. However, with a virtual memory model, the GPU is able to utilize and expand into a portion of the 2 gigabyte system memory.

To localize memory bandwidth requirements associated with each client of the system memory, the virtual memory system transfers blocks of data, called "pages," to the local memory subsystem utilizing the requested pages. Each page is typically fixed in size, for example 4 kilobytes, and represents a contiguous span of memory. Each page has a virtual address range within the virtual memory system and a corresponding physical address range that indicates the actual physical location of the page within some memory subsystem of the computing device. The virtual memory system maintains a mapping between virtual and physical memory locations. When the GPU requests access to a virtual address, the virtual memory system attempts to map the virtual address to the corresponding physical address. If the virtual address to physical address mapping indicates that the physical address of the requested page is within the GPU frame buffer memory, then the GPU accesses the page directly. However, if the requested page is not in the frame buffer memory, then the GPU generates a request, such as an interrupt, to a CPU-based page fault manager executing on the central processing unit (CPU). Typically, the CPU-based GPU page fault manager is a software module executing on the CPU as part of the GPU driver and support software. If the requested page is within system memory, the CPU-based GPU page fault manager transfers the page from system memory to the frame buffer memory and processing continues. If the page is not within system memory, then an erroneous request may be indicated. In some systems, a page fault in the system memory triggers a request to a still larger memory space stored on a mass storage system, such as a hard disk drive or RAID array. Each time the GPU requests access to data that is not in a page currently stored in frame buffer memory, the host CPU is interrupted to process the request. As the GPU increases system memory utilization, the page fault rate increases and the load on the host CPU increases.

One drawback of the above approach to implementing a virtual memory system with a GPU is that it significantly increases the load on the host CPU as applications executing on the GPU make more extensive use of virtualized memory. For example, the host CPU may readily experience a substantial computational load, in excess of 10%, as a result of modest paging activity between system memory and frame buffer memory.

As the foregoing illustrates, what is needed in the art is a more efficient technique for virtual memory management in systems employing a host CPU, system memory and a GPU that implements virtual memory.

SUMMARY OF THE INVENTION

One embodiment of the present invention sets forth a special purpose processing unit configured to locate a page of data stored using a virtual memory model. The special purpose processing unit includes a local memory management unit configured to perform a page lookup operation in a local memory and to generate a first page fault report, if the page of data is not found in the local memory, and a page fault manager configured to perform a page lookup operation in a system memory in response to the first page fault report. The page fault manager is further configured either to generate a second page fault report, if the page of data is not found in the system memory, or to access the page of data without involving a central processing unit, if the page of data is found in the system memory.

One advantage of the disclosed special purpose processing unit is that the hardware-based page fault manager includes a DMA engine capable of reading and writing pages between system memory and local memory without involving the CPU or operating system. A net improvement in system performance is achieved by processing a significant portion of page faults within the special purpose processing unit, thereby reducing the overall load on the host CPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
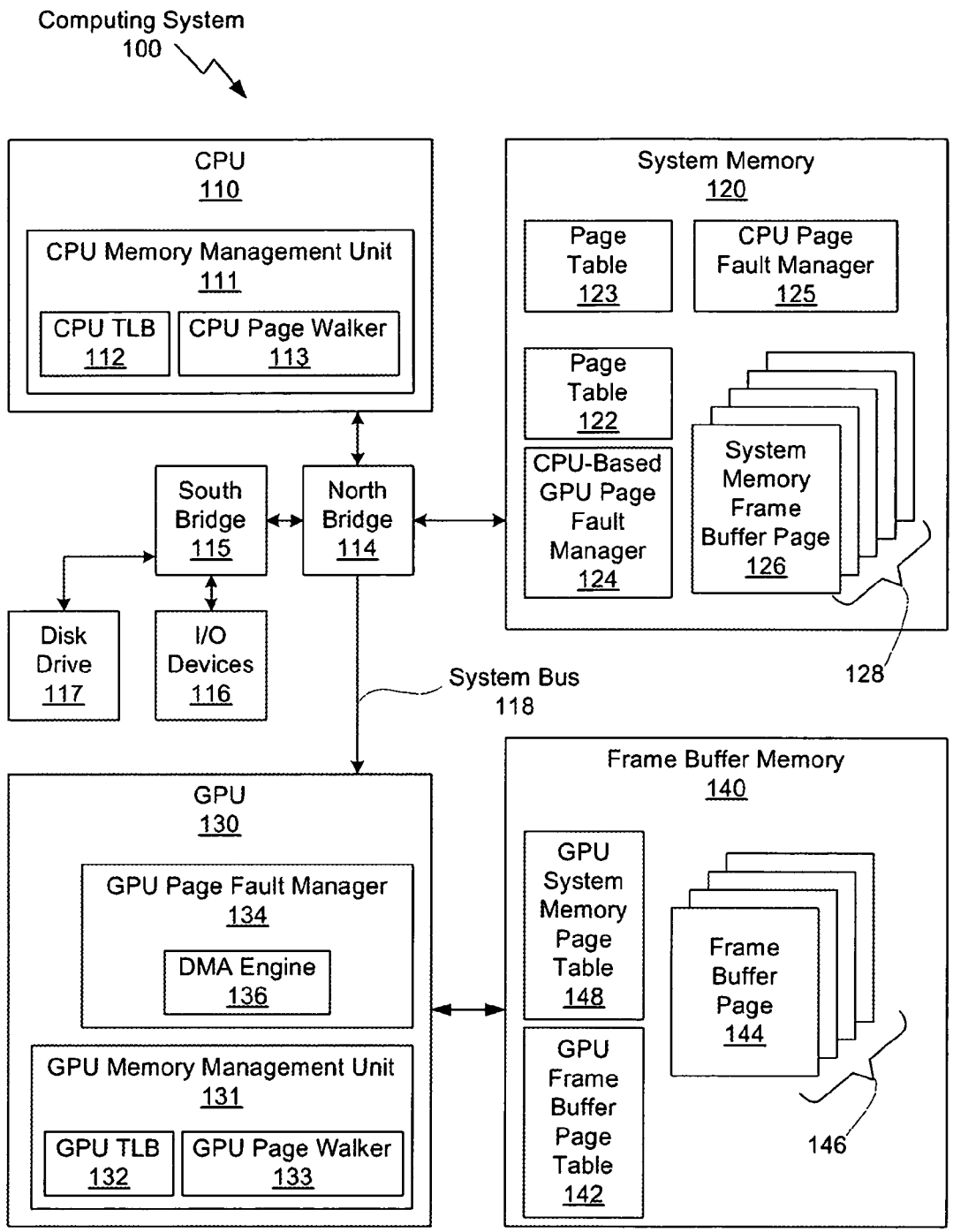
FIG. 1 is a block diagram of an exemplary computing system that includes a hardware-based GPU page fault manager in a GPU for local processing of memory page requests within the GPU, according to one embodiment of the invention.

FIG. 1 is a block diagram of an exemplary computing system 100 that includes a hardware-based GPU page fault manager 134 in a GPU 130 for local processing of memory page requests within the GPU 130, according to one embodiment of the invention. The computing system 100 includes CPU 110 with attached system memory 120 and the GPU 130 with an attached frame buffer memory 140. A north bridge 114 facilitates communication between the CPU 110 and other system elements, including the system memory 120, the GPU 130, and a south bridge 115. The south bridge 115 further communicates with I/O devices 116, such a keyboard and mouse (not shown) and an attached disk drive 117 for mass storage. In alternate embodiments, one or more hard disk drives may be attached to the north bridge 114 via a system bus, such as a PCI-express bus.

Many modern CPUs, including the popular x86-based devices, are designed to support a virtual memory model and include a translation look aside buffer (TLB) that is used to translate memory access requests from the CPU that are in a CPU virtual address space to physical memory addresses. Virtual memory access requests generated in the CPU 110 are presented to a CPU memory management unit 111, which provides virtual-to-physical address translation. The CPU memory management unit 111 presents virtual-to-physical translation requests to a CPU TLB 112 for fast, on-chip lookup in hardware. If the CPU TLB 112 includes an entry for the requested virtual-to-physical translation, this entry is used to process the virtual-to-physical translation. If the CPU TLB 112 does not include an entry that satisfies the virtual-to-physical translation request, then the CPU memory management unit 111 presents the request to a CPU page walker 113. The CPU page walker 113 searches a page table 123, stored in system memory 120 for a matching virtual-to-physical translation. If the CPU page walker 113 finds a virtual-to-physical translation in the page table 123, then this virtual-to-physical translation is used by the CPU memory management unit 111 to satisfy the virtual-to-physical translation request. Additionally, the CPU page walker 113 updates the CPU TLB 112 with the current virtual-to-physical translation. The CPU page walker 113 implements searching operations related to the page table 123 and management of the CPU TLB 112 in hardware. The CPU page walker 113 is commonly less efficient than the CPU TLB 112, but significantly less expensive per entry because the page table 123 is stored in system memory 120 rather than on the CPU 110 chip. Virtual-to-physical translation requests that are not satisfied by the CPU page walker 113 are referred to the operating system for processing in software by a CPU page fault manager 125. The CPU page fault manager 125 has knowledge of file systems on mass storage subsystems, such as the disk drive 117. The CPU's 110 virtual address space may be extended into the disk drive 117. Paging between the disk drive 117 and system memory 120 is managed by the CPU page fault manager 125, which therefore, also updates and manages the page table 123.

The GPU 130 includes a GPU memory management unit 131 and the GPU page fault manager 134. The GPU memory management unit 131 operates similarly to the CPU Memory Management Unit 111 in the CPU 110. That is, memory access requests in the virtual memory space of the GPU 130, independent of the CPU virtual memory space, are presented to the GPU memory management unit 131, which translates virtual addresses to physical addresses. The GPU TLB 132 has limited resources to conduct the virtual-to-physical address translation and, therefore, only address ranges corresponding to a certain number of pages are known to the GPU TLB 132. Typically, the most recently accessed virtual-to-physical page translations are known to the GPU TLB 132, while the translation table entries for less recently accessed translations are overwritten with more recent translations. Each translation known to the GPU TLB 132 is associated with a particular frame buffer page, such as frame buffer page 144. All frame buffer pages 146 are stored in the frame buffer memory 140. If the GPU TLB 132 does not include a translation entry for a requested virtual-to-physical translation, the GPU memory management unit 131 refers the translation request to the GPU page walker 133, which searches a GPU frame buffer page table 142 for the virtual-to-physical translation. If the GPU page walker 133 finds the requested translation, processing proceeds using the virtual-to-physical translation from the GPU frame buffer page table. Additionally, the GPU page walker 133 updates the GPU TLB 132 with the translation found in the GPU frame buffer page table 142.

Thus, the contents of virtual address pages currently known to and managed by the GPU memory management unit 131 are stored in the frame buffer pages 146, while the associated virtual-to-physical address translation of each of the frame buffer pages 146 is stored in the GPU frame buffer page table 142, with a number of these translations cached in the GPU TLB 132. If the virtual address of a requested page is not known to the GPU memory management unit 131, then the GPU memory management unit 131 generates a page fault, escalating the page request to the GPU page fault manager 134.

The GPU page fault manager 134 intercepts page faults from the GPU memory management unit 131 and processes the page faults, if possible, without further involvement of the CPU 110. The GPU page fault manager 134 maintains a table of virtual-to-physical address translations that are stored in the GPU system memory page table 148, which resides within frame buffer memory 140. Each entry for a virtual-to-physical translation in the GPU system memory page table 148 is associated with a page, such as system memory frame buffer page 126, stored in system memory 120. When an intercepted page fault indicates access to a virtual-to-physical address translation represented in the GPU system memory page table 148, then the GPU page fault manager 134 initiates a data transfer operation between system memory 120 and frame buffer memory 140 using the DMA engine 136 over the system bus 118. For example, if the GPU requests a read to a virtual memory address that translates to the system memory frame buffer page 126, then the GPU memory management unit 131 does not recognize the address and generates a page fault. The page fault is intercepted by the GPU page fault manager 134, which locates the virtual-to-physical address translation in a GPU system memory page table 148 entry that is associated with the system memory frame buffer page 126. The system memory frame buffer page 126 is then transferred to a frame buffer page, such as frame buffer page 144, in frame buffer memory 140 via a direct memory access operation performed by the DMA engine 136. The GPU memory management unit 131 is informed of the newly available frame buffer page 144 and the corresponding virtual-to-physical address translation. Once the page transfer operation is completed, the GPU 130 may begin accessing the data in the new frame buffer page 144.

If the GPU page fault manager 134 does not find the requested virtual address in the GPU page table 148, then the page fault is reported to the CPU-based GPU page fault manager 124 in the form of a process-to-process message such as an interrupt. The CPU-based GPU page fault manager 124 is a software-based function and stores virtual-to-physical address translations in a software-based page table 122, which resides in the system memory 120. The CPU-based GPU page fault manager 124 operates on GPU virtual address space requests and functions similarly to the CPU page fault manager 125, which operates on CPU virtual address space requests.

System memory pages 128 stored in system memory 120 that are allocated for use by the GPU 130 may be remain under operating system page management control or may be allocated as carve out of pages that the operating system does not explicitly manage, giving greater control to the GPU page fault manager 134 and the CPU-based GPU page fault manager 124.

Figure 2:
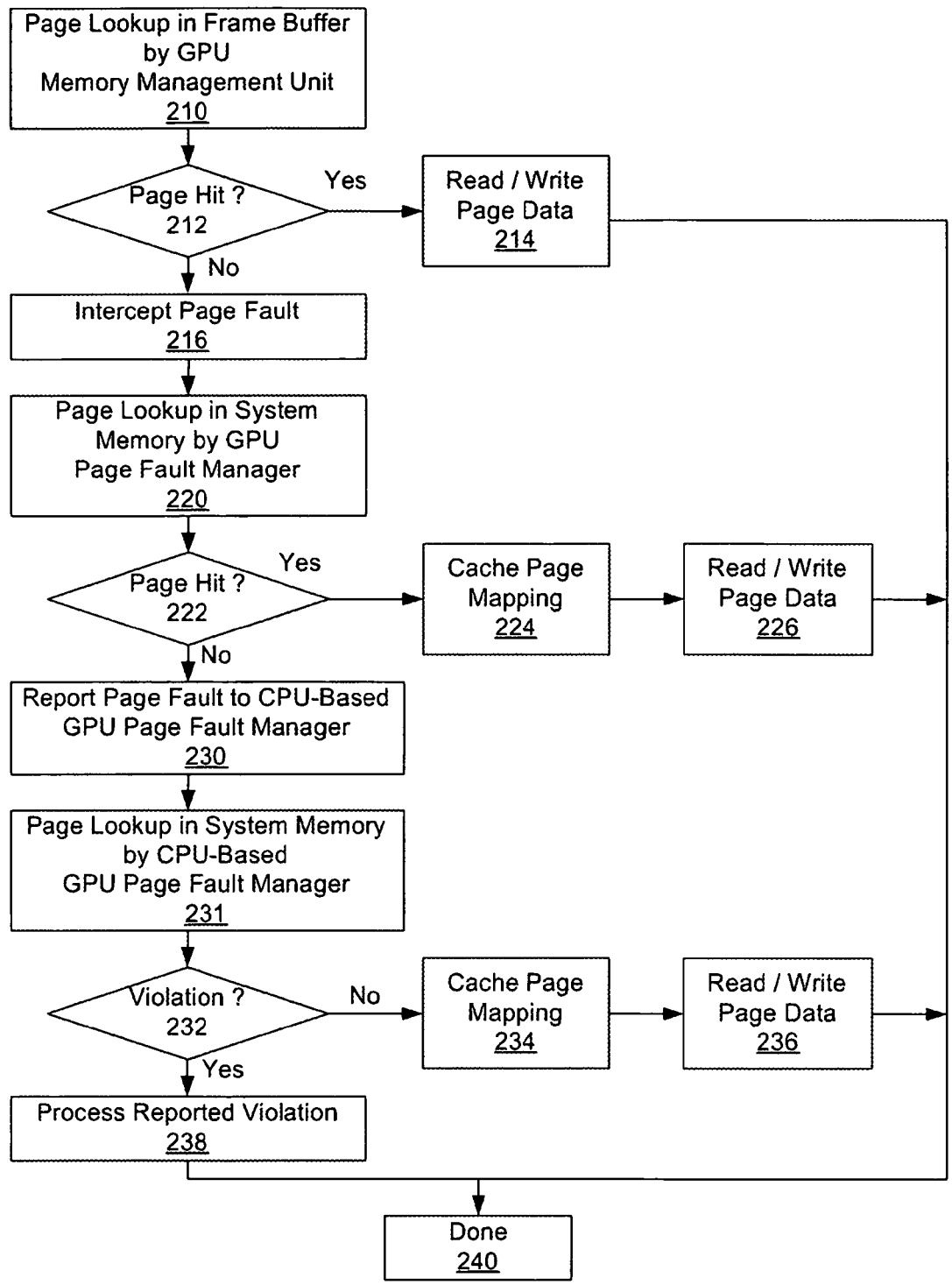
FIG. 2 is flow diagram of method steps for processing GPU virtual address requests, according to one embodiment of the invention.

FIG. 2 is flow diagram of method steps for processing GPU virtual address requests, according to one embodiment of the invention. Although the method steps are described in conjunction with FIG. 1, persons skilled in the art will understand that any system that performs the method steps, in any order, is within the scope of the invention.

The method of processing virtual address requests begins in step 210, where a page lookup in the frame buffer memory 140 is conducted by the GPU memory management unit 131. If the requested page is found as indicated by a page hit in step 212, then the method proceeds to step 214, where the page data is read or written, as determined by the type of request. The method then terminates in step 240.

If the requested page is not found, as indicated by a page miss in step 212, then a page fault is generated by the GPU memory management unit 131, and the method proceeds to step 216, where the resulting page fault is intercepted by the GPU page fault manager 134. In step 220, the GPU page fault manager 134 searches the GPU system memory page table 148 for a virtual-to-physical address translation corresponding to the requested page. If the requested page is found, as indicated by a page hit in step 222, then the method proceeds to step 224. In step 224, the GPU page fault manager 134 reports the virtual-to-physical address translation corresponding to the requested page to the GPU memory management unit 131, which caches the translated page mapping in both the GPU frame buffer page table 142 and GPU TLB 132 for later use. The method then proceeds to step 226, where the DMA engine 136 performs the requested read or write operation on the respective page via a direct memory access operation. The method then terminates in step 240.

If the requested page is not found, as indicated by a page miss in step 222, then the method proceeds to step 230, where a page fault is reported to the CPU-based GPU page fault manager 124, for example, as an interrupt over the system bus 118. The method then proceeds to step 231, where the CPU-based GPU page fault manager 124 looks up the requested page in the page table 122. If the page is not found, as indicated by a page violation in step 232, then violation is processed in any technically appropriate fashion, and the method terminates in step 240.

If the requested page is found, as indicated as a "no violation" in step 232, then the method proceeds to step 234, where the virtual-to-physical address translation determined by the CPU-based GPU page fault manager 124 is reported to the GPU page fault manager 134, which caches the translated page mapping for later use. Additionally, the GPU memory management unit 131 may cache the translated page mapping for later use. The method then proceeds to step 236, where the requested read or write operation is conducted on the respective page via techniques commonly used in the art. The method then terminates in step 240.

In sum, the computer system 100 includes the GPU 130 with the GPU memory management unit 131, which provides virtual address to physical address translation for access to pages 146 stored within the frame buffer memory 140. If a virtual address is requested for a page that is not stored in frame buffer memory 140, a page fault is generated by the GPU memory management unit 131. The page fault is intercepted by the GPU page fault manager 134, which performs a virtual-to-physical address translation using the GPU system memory page table 148, assuming there is such a translation within the GPU system memory page table 148 corresponding to the requested page. The DMA engine 136 then transfers the requested page between the system memory 120 and the frame buffer memory 140 via a direct memory transfer operation without any CPU-based software involvement or operating system overhead. By enabling the GPU 130 to manage pages 128 stored in system memory 120 through the GPU system memory page table 148, stored in frame buffer memory 140, greater efficiency is achieved in terms of both page fault throughput and latency. Importantly, a substantial reduction in computational load on the host CPU 110 is simultaneously achieved.

While the forgoing is directed to embodiments of the present invention, other and further embodiments of the invention may be devised without departing from the basic scope thereof. For example, although the above figures describe a graphics processing unit and associated frame buffer, the same concepts apply equally to any type of special purpose processing unit and associated local memory. The scope of the present invention is therefore determined by the claims that follow.

I claim:

1. A computer-implemented method for using a virtual address to locate a page of data stored in a system that includes a central processing unit, a system memory coupled to the central processing unit, and a local memory coupled to a special purpose processing unit, the method comprising:

performing a first page lookup operation to determine whether the virtual address associated with the page of data has a corresponding physical address in the local memory;

generating a first page fault report, if the virtual address does not have a corresponding physical address in the local memory, wherein the first page fault report is not handled by the central processing unit;

performing a second page lookup operation to determine whether the virtual address associated with the page of data has a corresponding physical address in the system memory in response to the first page fault report; and either generating a second page fault report to be handled by the central processing unit, if the virtual address does not have a corresponding physical address in the system memory, or accessing the page of data without involving the central processing unit, if the page of data is found the system memory.

2. The method of claim 1, wherein the first page fault report is transmitted to the central processing unit, and further comprising the step of intercepting the first page fault report such that the first page fault report is not received by the central processing unit.

3. The method of claim 1, wherein the step of accessing the page of data comprises performing a direct memory access operation.

4. The method of claim 1, wherein the step of performing the second page lookup operation comprises determining whether an entry for the page of data is included in a page table stored in the local memory.

5. The method of claim 4, wherein an entry for the page of data is included in the page table stored in the local memory, and further comprising the step of determining a physical address of the page of data within the system memory based on the page table entry.

6. The method of claim 1, wherein the special purpose processing unit is a graphics processing unit and the local memory is a frame buffer coupled to the graphics processing unit.

7. A special purpose processing unit residing within a system that also includes a central processing unit and a system memory coupled to the central processing unit, wherein the special purpose processing unit is configured to use a virtual address to locate a page of data, the special purpose processing unit comprising:

a local memory management unit configured to perform a first page lookup operation to determine whether the virtual address associated with the page of data has a corresponding physical address in a local memory coupled to the special purpose processing unit and to generate a first page fault report, if the page of data is not found in the local memory, wherein the first page fault report is not handled by the central processing unit;

a page fault manager configured to perform a second page lookup operation to determine whether the virtual address associated with the page of data has a corresponding physical address in the system memory in response to the first page fault report, and further configured either to generate a second page fault report to be handled by the central processing unit, if the virtual address does not have a corresponding physical address in the system memory, or to access the page of data without involving a central processing unit, if the page of data is found in the system memory.

8. The special purpose processing unit of claim 7, wherein the local memory management unit is configured to transmit the first page fault report to the central processing unit, and the page fault manager is configured to intercept the first page fault report such that the first page fault report is not received by the central processing unit.

9. The special purpose processing unit of claim 7, wherein the page fault manager is configured to perform a direct memory access operation to access the page of data.

10. The special purpose processing unit of claim 9, wherein the page fault manager includes a direct memory access engine for performing the direct memory access operation.

11. The special purpose processing unit of claim 7, wherein the page fault manager is configured to determine whether an entry for the page of data is included in a page table stored in the local memory when performing the first page lookup operation in response to the first page fault report.

12. The special purpose processing unit of claim 11, wherein an entry for the page of data is included in the page table stored in the local memory, and the page fault manager is configured to determine a physical address of the page of data within the system memory based on the page table entry.

13. The special purpose processing unit of claim 7, wherein the local memory is a frame buffer, and the special purpose processing unit is a graphics processing unit.

14. A computing device configured for using a virtual address to locate a page of data, the computing device comprising:

a system memory;
a central processing unit coupled to the system memory;
a local memory; and
a special purpose processing unit coupled to the local memory and including:
a local memory management unit configured to perform a first page lookup operation to determine whether the virtual address associated with the page of data has a corresponding physical address in the local memory and to generate a first page fault report, if the page of data is not found in the local memory, wherein the first page fault report is not handled by the central processing unit; and
a page fault manager configured to perform a second page lookup operation to determine whether the virtual address associated with the page of data has a corresponding physical address in the system memory in response to the first page fault report, and further configured either to generate a second page fault to be handled by the central processing unit, if the page of data is not found virtual address does not have a corresponding physical address in the system memory, or to access the page of data without involving a central processing unit, if the page of data is found in the system memory.

15. The computing device of claim 14, wherein the local memory management unit is configured to transmit the first page fault report to the central processing unit, and the page fault manager is configured to intercept the first page fault report such that the first page fault report is not received by the central processing unit.

16. The computing device of claim 14, wherein the page fault manager is configured to perform a direct memory access operation to access the page of data.

17. The computing device of claim 16, wherein the page fault manager includes a direct memory access engine for performing the direct memory access operation.

18. The computing device of claim 14, wherein the page fault manager is configured to determine whether an entry for the page of data is included in a page table stored in the local memory when performing the first page lookup operation in response to the first page fault report.

19. The computing device of claim 18, wherein an entry for the page of data is included in the page table stored in the local memory, and the page fault manager is configured to determine a physical address of the page of data within of the system memory based on the page table entry.

20. The computing device of claim 14, wherein the local memory is a frame buffer, and the special purpose processing unit is a graphics processing unit.

* * * * *